United States Patent
Li et al.

(10) Patent No.: US 8,128,998 B2
(45) Date of Patent: Mar. 6, 2012

(54) POLYURETHANE COATING CURE ENHANCEMENT USING ULTRAFINE ZINC OXIDE

(75) Inventors: Minyu Li, Oakdale, MN (US); Robert D. P. Hei, Baldwin, WI (US); Mark D. Levitt, Saint Paul, MI (US); Lauren K. Carlson, Saint Paul, MI (US)

(73) Assignee: Ecolab USA Inc., St. Paul, MN (US)

( * ) Notice: Subject to any disclaimer, the term of this patent is extended or adjusted under 35 U.S.C. 154(b) by 1422 days.

(21) Appl. No.: 10/755,975

(22) Filed: Jan. 12, 2004

(65) Prior Publication Data

US 2005/0153068 A1    Jul. 14, 2005

(51) Int. Cl.
C08K 3/10 (2006.01)
C08L 75/00 (2006.01)
B05D 1/36 (2006.01)
B05D 7/00 (2006.01)

(52) U.S. Cl. ............... 427/407.1; 427/385.5; 524/435; 524/589

(58) Field of Classification Search ............... 427/407.1, 427/180; 524/435, 589
See application file for complete search history.

(56) References Cited

U.S. PATENT DOCUMENTS

| | | | |
|---|---|---|---|
| 3,884,849 A | 5/1975 | Molbert | |
| 4,038,113 A * | 7/1977 | Oberth | 149/19.4 |
| 4,038,114 A * | 7/1977 | Oberth | 149/19.4 |
| 4,278,578 A | 7/1981 | Carpenter | |
| 4,517,330 A | 5/1985 | Zdanowski et al. | |
| 4,622,360 A | 11/1986 | Gomi et al. | |
| 4,891,248 A | 1/1990 | Kraus | |
| 5,315,734 A | 5/1994 | Kresse et al. | |
| 5,319,018 A | 6/1994 | Owens et al. | |
| 5,390,390 A | 2/1995 | Kresse et al. | |
| 5,680,667 A | 10/1997 | Kresse et al. | |
| 5,811,365 A | 9/1998 | Barry | |
| 5,887,311 A | 3/1999 | Kresse et al. | |
| 5,965,686 A | 10/1999 | Blank et al. | |
| 5,998,035 A | 12/1999 | Iwamura et al. | |
| 6,009,297 A | 12/1999 | Maeda et al. | |
| 6,114,279 A | 9/2000 | Fukui et al. | |
| 6,316,535 B1 | 11/2001 | Caldwell et al. | |
| 6,335,479 B1 * | 1/2002 | Yamada et al. | 136/251 |
| 6,544,942 B1 | 4/2003 | Smith et al. | |
| 6,583,101 B1 | 6/2003 | Wiseth et al. | |
| 6,727,334 B2 * | 4/2004 | Nishiwaki et al. | 526/240 |
| 6,824,943 B2 * | 11/2004 | Gambayashi | 430/108.6 |
| 6,830,860 B2 * | 12/2004 | Sacripante et al. | 430/109.3 |
| 2002/0028621 A1 | 3/2002 | Levitt et al. | |
| 2002/0183455 A1 | 12/2002 | Gray et al. | |
| 2004/0096663 A1* | 5/2004 | Yamaguchi et al. | 428/403 |
| 2004/0109057 A1* | 6/2004 | Pan et al. | 347/106 |
| 2004/0142266 A1* | 7/2004 | Sacripante et al. | 430/109.3 |
| 2004/0254282 A1* | 12/2004 | Suzuki et al. | 524/430 |

FOREIGN PATENT DOCUMENTS

| | | |
|---|---|---|
| EP | 911 463 A2 | 4/1999 |
| EP | 830 402 B1 | 1/2000 |
| EP | 1 433 827 A1 | 6/2004 |
| GB | 2216039 | 4/1989 |
| JP | 06-025593 | 2/1994 |
| WO | WO 92/20463 | 11/1992 |
| WO | WO 98/11168 | 3/1998 |

OTHER PUBLICATIONS

Owens, Joseph M., *It's What's on the Inside that Counts-The Chemistry of Floor Polishes*, Technology of Floor Maintenance and Current Trends, pp. 3-28 (2004).
Braun, Juergen H., *Federation Series on Coatings Technology: White Pigments*, Federation of Societies for Coatings Technology, 44 pgs. (Jun. 1995).
*Anti-static coating solution for flat panel dispiay(display)*, Product Development Room, Advanced Materials Business Division, pp. 45-46, Technical Report 1999.
*Applications* retrieved online from the Nanophase Technologies Corporation Home Page on Dec. 11, 2003, from the Internet: <URL: http://www.nanophase.com/.
*ATO anti-static coating inks and coating film*, Display Materials Group, Advanced Materials Business Division, Shinichi Tanaka et al., pp. 32-34, Technical Report 2000.
*Floor Finish Products* page retrieved from the Jan. 8, 2003 Internet Archives entries stored at Internet:<URL: http://web.archive.org/web/20030118031312/http://www.chemcor.net/floor_finish.htm, pp. 1-3.
*Ultraviolet Hardening Type Antistatic Hard Coat Paint for Plastic*, Technical Documents, Advanced Materials Division, Sumitomo Osaka Cement Co., Ltd., retrieved online from the Sumitomo Osaka Cement Co., Ltd., Home Page on Dec. 11, 2003 from the Internet:<URL:http://www.socnb.com.
*Ultrafine Zinc Oxide(ZnO)*, Advanced Materials Division Sales Group, Sumitomo Osaka Cement Co., Ltd., (possibly dated "Jan. 2003").
*Markets and Products, I & I Floorcare, Mixed-Metals Crosslinked Floor Care Polymers*, pp. 1-2, retrieved online on Sep. 11, 2033 from the Internet: <URL: http://www.rohmhass.com/rhcis/markets_and_products/FloorCarePolymersMixedMetal.htm.
*Aqueous Two-Component Polyurethane(2K-PUR) Coatings: An Evolving Technology*, Martin Melchiors et al., pp. 1-10, retrieved online on Sep. 11, 2003 from the Internet: <URL: http://www.coatings.de/articles/ecspapers/melchiors/melchiors.htm.
No. AD200C1 polyester polyurethane formulation, Air Products and Chemicals, Inc. (Apr. 2001).
STAY-CLAD™ 5900 Technical Bulletin, Reichold, Inc. (Oct. 2001).
No. G-2029 acrylic polyurethane formulation, Zeneca Resins (dated "Jan. 3, 2000").

* cited by examiner

*Primary Examiner* — Peter F Godenschwager
(74) *Attorney, Agent, or Firm* — Andrew D. Sorensen; Laura C. Dilorenzo; Amy J. Hoffman

(57) ABSTRACT

Ultrafine zinc oxide can initiate hardening of polyurethane coatings and decrease the coating tack-free time. The decreased tack-free times facilitate earlier application of additional polyurethane layers and earlier return of a coated article to service, and can provide improved floor finishes.

23 Claims, No Drawings

POLYURETHANE COATING CURE ENHANCEMENT USING ULTRAFINE ZINC OXIDE

TECHNICAL FIELD

This invention relates to hardenable polyurethane coatings, to methods for applying polyurethane coatings and to polyurethane coated articles.

BACKGROUND

Polyurethane coatings are widely used for applications in which a protective overcoat or film is desired. For example, two-component or so-called "2K" polyurethanes containing a polyol or polyamine first component and a polyisocyanate second component will react when mixed to form a durable film containing polyurethane or polyurea linkages. Unfortunately, 2K polyurethane coatings can have lengthy drying times. If uncatalyzed, the coating can take hours to become tack-free and days to harden completely. The hardening rate can be accelerated by adding a suitable catalyst or initiator. Although a variety of materials have been suggested for use as initiators, nowadays polyurethane coatings typically are hardened using an organometallic compound such as dibutyltin dilaurate, e.g. as in U.S. Pat. No. 6,316,535 B1.

U.S. Pat. No. 5,811,365 describes metal-containing zinc oxide compositions for use in Fischer Tropsch reactions. The zinc oxide is said to function as a support for the metal catalyst. U.S. Pat. No. 6,114,279 describes a zinc oxide-containing composition for methanol synthesis and reforming. U.S. Pat. No. 3,884,849 describes polyetherurethane foams containing, inter alia, zinc oxide and certain zinc salts. U.S. Pat. No. 6,316,535 B1 describes water-based polyurethane coating compositions containing a variety of fillers including zinc oxide.

SUMMARY OF THE INVENTION

Due to their relatively long tack-free times, multiple-component polyurethane coatings can be difficult to apply to flooring. Following application of the polyurethane coating, the floor cannot be put into service until the hardening process has advanced sufficiently so that the floor can withstand foot traffic. Sometimes it is necessary to apply more than one layer of polyurethane coating in order to obtain sufficient film thickness and durability. In such cases the polyurethane coating cannot be recoated until the hardening process has advanced sufficiently so that the floor can be walked upon to apply the second or subsequent layers. While hardening of the various layers takes place, the floor is out of service and the finish is susceptible to damage. Catalysts such as dibutyltin dilaurate can sometimes be employed to reduce coating tack-free times, but this may also undesirably increase cost owing to dibutyltin dilaurate's relatively high price.

We have found that ultrafine zinc oxide can be used to initiate rapid hardening of multicomponent polyurethanes. The hardening effect appears to be generally at least as rapid as that obtained using a similar weight of dibutyltin dilaurate. The hardening effect does not appear to occur when using a conventional finely divided zinc oxide powder. When added in an appropriate amount, ultrafine zinc oxide can substantially decrease the coating tack-free time without unduly shortening pot life. Ultrafine zinc oxide can also initiate hardening of a multicomponent polyurethane coating when present in an adjacent non-polyurethane layer, whereas dibutyltin dilaurate does not appear to provide such an effect.

The present invention provides in one aspect an autohardenable polyurethane coating comprising sufficient ultrafine zinc oxide to decrease the coating tack-free time.

In another aspect the invention provides a method for applying a polyurethane finish comprising applying to a substrate a layer of an autohardenable polyurethane coating comprising sufficient ultrafine zinc oxide to decrease the coating tack-free time.

The invention also provides a jobsite-renewable floor finish kit comprising a substantially isocyanate-free undercoat, an autohardenable polyurethane topcoat and instructions for jobsite application of the undercoat to a floor and the topcoat to the undercoat, wherein the undercoat or topcoat contain sufficient ultrafine zinc oxide to decrease the topcoat tack-free time.

The invention provides in another aspect a method for applying a jobsite-renewable finish to a floor comprising applying to the floor a multilayer coating system comprising a layer or layers of a substantially isocyanate-free undercoat and a layer or layers of an autohardenable polyurethane topcoat, wherein the undercoat or topcoat contain sufficient ultrafine zinc oxide to decrease the topcoat tack-free time.

DETAILED DESCRIPTION

By using words of orientation such as "atop", "beneath", "on", "under", "uppermost", "lowermost", "between" and the like for the location of various layers in the disclosed multilayer coating system, we refer to the relative position of one or more layers with respect one another or where the context requires with respect to an underlying flooring substrate. We do not intend that the layers or flooring substrate must be horizontal, do not intend that the layers and flooring substrate must be contiguous or continuous, and do not exclude the presence of one or more intervening layers between layers or between the flooring substrate and a layer.

As used in connection with this disclosure, a "multilayer coating system" is a coating system that employs an undercoat and a topcoat of different compositions. In the interest of brevity, a layer or plurality of layers of the undercoat composition located between the flooring substrate and a topcoat may be referred to collectively as an "undercoat", a layer or plurality of layers of the topcoat composition located atop the flooring substrate and undercoat may be referred to collectively as the "topcoat", and a combination of a cured undercoat and topcoat (or a topcoat alone) located atop a flooring substrate may be referred to as a "coating" or "finish".

As used in connection with this disclosure, a "film-former" is a monomer, oligomer or polymer that can be applied (if need be, with a suitable plasticizer or coalescing solvent) and dried, crosslinked or otherwise hardened to form a tack-free substantially durable film.

As used in connection with this disclosure, a "hardening system" is a chemical or physical process (including solvent evaporation or other drying processes, photochemical reactions, electrochemical reactions, radical processes, ionic processes, moisture cure processes and multiple-component (e.g., two or three component) crosslinking processes) through which an undercoat or topcoat composition becomes dried, crosslinked or otherwise cured to form a tack-free substantially durable film.

As used in connection with this disclosure, an "initiator" is an agent that can cause undercoat or topcoat hardening or accelerate the rate at which undercoat or topcoat hardening occurs. We include among initiators materials such as catalysts (including energy activated catalysts, photocatalysts or photoinitiators and thermal catalysts), Lewis and Brönsted acids and bases, radical sources, metal compounds and the like.

As used in connection with this disclosure, an "autohardenable" polyurethane is a coating that contains a polyol or polyamine and a polyisocyanate, and which begins hardening upon being mixed or dispensed and without requiring an external energy source such as UV or visible light illumination or elevated heating to harden to at least a tack-free state when in a thin film form. We include among autohardenable polyurethanes those having multi-part (e.g., two-part) formulations with two or more separately packaged polyurethane precursors (typically a polyol or polyamine first component and a polyisocyanate second component) that will harden shortly after the precursors are mixed and applied to a flooring substrate. We also include among autohardenable polyurethanes those whose precursors are packaged in a single container having one or more septa or other suitable dividers that can prevent the precursors from mixing until desired by a user. We also include among autohardenable polyurethanes those containing an encapsulated ingredient that will cause hardening of the polyurethane when the precursors are mixed, dispensed or otherwise processed in a way that causes the microcapsules to rupture.

As used in connection with this disclosure, "pot life" is the time period after an autohardenable polyurethane is dispensed from its container (and if need be, its precursors mixed, dispensed or otherwise processed to initiate hardening) during which the dispensed material can successfully be applied to a flooring substrate to form a thin, visibly smooth, self-leveling, cured film whose properties are generally similar to those exhibited by the polyurethane if applied immediately after being dispensed.

As used in connection with this disclosure, a polyurethane is regarded as being "stripper-permeable" if when coated atop a desired flooring substrate (and optional intervening undercoat) and subjected to the action of a suitable chemical stripper, the stripper permeates or otherwise penetrates the polyurethane sufficiently so that the polyurethane (and undercoat, if present) can be removed from the floor. Stripper permeability can sometimes be enhanced by mechanically roughening, puncturing or abrading the polyurethane (using, for example, a nonwoven floor scrub pad, brush or other mild abrasive measure) just prior to stripping. A polyurethane will be regarded as being stripper-permeable even if such mechanical roughening is necessary for stripping, so long as such mechanical roughening does not unduly damage the underlying floor.

As used in connection with this disclosure, a hardened coating is regarded as being "jobsite-renewable" if, at such time as it may be desired to do so, the coating can be removed from an underlying flooring substrate without removing substantial portions of the flooring substrate, using simple, minimally abrasive measures such as a methylene chloride-free or acetone-free chemical stripper and a mop and detergent solution, mildly abrasive but flooring-safe measures such as a nonwoven floor scrub pad, or other measures such as peeling (and without requiring aggressive removal techniques such as grinding, sanding, sandblasting or a stripper based on methylene chloride or acetone), and then replaced with the same or a substantially similar finish and hardened to provide a visibly smooth tack-free substantially durable film.

As used in connection with this disclosure, an "oligomer" is a polymerizable (e.g., crosslinkable) moiety containing a plurality (e.g., 2 to about 30) of monomer units.

As used in connection with this disclosure, the term "ultrafine zinc oxide" refers to zinc oxide powder having an average particle diameter that is sufficiently small so that a 0.1 wt. % addition of the powder (or its equivalent solids weight as a dispersion) to the 2K polyurethane used in Example 1 will increase the polyurethane's hardening rate. Preferably the ultrafine zinc oxide has an average particle diameter or average crystallite size less than the shortest wavelength of visible light (or in other words, less than about 400 nanometers) and more preferably about 10 to 200 nm. Preferably the ultrafine zinc oxide has a high surface area, e.g., greater than about 1 $m^2/g$ as determined using the BET method and more preferably about 10 to about 200 $m^2/g$. Representative commercially available ultrafine zinc oxides include NANOGARD™ zinc oxide, NANOPHASE™ zinc oxide and NANOTEK™ zinc oxide (commercially available from Nanophase Technologies Corp.), NANOZINC OXIDE™ (commercially available from Greencorp Magnetics Pty. Ltd.), ZnO-310 and ZnO-350 ultrafine zinc oxide (commercially available from Sumitomo-Osaka Cement Co.) and ZINOX™ 350 ultrafine zinc oxide (commercially available from American Chemet Corp.). Waterborne ultrafine zinc oxide solutions or dispersions are especially preferred for use with waterborne polyurethane coating components.

Sufficient ultrafine zinc oxide should be employed in the polyurethane coating (or in an adjacent layer of a substantially isocyanate-free coating) so that the polyurethane tack-free time decreases. Preferably the tack-free time decreases by at least about 10%, more preferably by at least about 30% and most preferably by at least about 50% compared to a polyurethane coating prepared without any ultrafine zinc oxide or other initiator in the coating (or in an adjacent coating) and evaluated using the cotton ball Tack-free Evaluation method described below. If present in the polyurethane, the ultrafine zinc oxide concentration preferably is sufficiently low so that the polyurethane has a pot life of at least about 20 minutes, more preferably at least about 30 minutes, and yet more preferably at least about 1 to about 2 hours. As a general numeric guide, when ultrafine zinc oxide is added to the topcoat, the topcoat preferably contains about 0.001 to about 7 wt. % ultrafine zinc oxide, more preferably about 0.01 to about 2 wt. % based on the total topcoat weight. When used in an adjacent substantially isocyanate-free coating (e.g., an undercoat in the case of a multilayer floor finish composition), the adjacent layer preferably contains about 1 to about 50 wt. % ultrafine zinc oxide, more preferably about 2 to about 35 wt. %, and most preferably about 5 to about 25 wt. % based on the ultrafine zinc oxide weight compared to the total undercoat weight. The ultrafine zinc oxide may also be applied by itself underneath a topcoat, and used to initiate topcoat cure even though not initially part of an adjacent layer containing a film former. Preferably the polyurethane and ultrafine zinc oxide are combined using stirring or other methods that will be apparent to those skilled in the art. If added as an aqueous dispersion to a multicomponent polyurethane, the ultrafine zinc oxide preferably is added to the polyol or polyamine precursor rather than to a polyisocyanate precursor to prevent premature reaction. If added in an appropriate organic solvent, the ultrafine zinc oxide can be added to the polyisocyanate precursor if desired. The addition can take place well prior to or at a job site.

A variety of polyurethane precursors can be employed in the invention. The precursors as mixed or dispensed may be solvent-borne, waterborne or 100% solids, and may represent a multipart (e.g., a two component or 2K) composition or a latent one part composition containing a blocked isocyanate and, if desired, a suitably encapsulated ultrafine zinc oxide. The polyurethane precursors preferably are water-soluble or water-dispersible. Water solubility or water dispersibility can be facilitated in a variety of ways that will be familiar to those skilled in the art, including incorporating appropriate functional groups in the polyurethane precursors, converting one or more of the polyurethane precursors to their salt forms, or adding a suitable cosolvent or surfactant. Preferred polyurethane formulations include those employing a (i) polyol such as a polyester polyol, polyether polyol, acrylic polyol or combination thereof and (ii) a polyisocyanate such as an aliphatic or aromatic isocyanate oligomer. Two component waterborne polyurethane formulations are especially preferred. As a general guide, the water concentration preferably is from about 15 to about 85 wt. % based on the polyurethane weight. More preferably, the polyurethane contains about 25 to about 75 wt. % water, and most preferably about 35 to about 70 wt. % water. The polyurethane may also contain a suitable diluent, solvent, plasticizer or cosolvent, at a concentration which may vary depending in part on the other polyurethane ingredients and on the intended application and application conditions. As a general guide, the diluent, solvent, plasticizer or cosolvent concentration preferably is from 0.1 to about 10 wt. % based on the polyurethane solution weight, and more preferably about 1 to about 7 wt. %.

Representative waterborne polyurethanes are described in U.S. Pat. Nos. 6,316,535 B1 and 6,544,942 B1 and in U.S. patent application Publication No. 2002/0028621 A1. Suitable commercially or experimentally available two-part waterborne polyurethanes include those from suppliers including Air Products and Chemicals, Inc. (e.g., No. AD200C1 polyester polyurethane formulation), Bayer AG (e.g., No. MG98-040 polyester polyurethane formulation), Reichhold, Inc. (e.g., No. STAY-CLAD™ 5900 hydroxyl-functional acrylic polymer dispersion and No. 3955-24W acrylic polyurethane formulation), U.S. Polymers, Inc. (e.g., Nos. 979-1 and 980-3 polyester polyurethane formulations) and Zeneca Resins (e.g., No. G-2029 acrylic polyurethane formulation).

The polyurethane can contain a variety of adjuvants to alter its performance or properties before or after application to a floor. Useful adjuvants include hardening retarders (which function as pot life extenders), inorganic particles, organic (e.g., polymeric) particles, flatting agents, surfactants, surface slip modifiers, defoamers, waxes, indicators, UV absorbers, light stabilizers, antioxidants, plasticizers, coalescents and adhesion promoters. The types and amounts of such adjuvants will be apparent to those skilled in the art. The polyurethane may if desired be a pigmented coating or paint. The polyurethane can also contain a lightening agent (described further in application Ser. No. 10/756,120) entitled FLOOR FINISH WITH LIGHTENING AGENT, filed even date herewith, the disclosure of which is incorporated herein by reference).

The polyurethane may contain inorganic or organic particles (or both inorganic and organic particles) to enhance its abrasion resistance, scratch resistance, wear resistance or strippability. Preferred inorganic particles are described in copending U.S. patent application Ser. No. 09/657,420 filed Sep. 8, 2000 and entitled SCRATCH-RESISTANT STRIPPABLE FINISH, the disclosure of which is incorporated herein by reference. Representative inorganic particles include silicas such as fumed silicas, stabilized silica sols, silica organosols, silicon dioxide particles, colloidal silicas and spherical silicas; aluminas such as aluminum oxide particles and alumina modified colloidal silica; and glasses such as glass beads and glass microbubbles. Representative organic particles include EXPANCEL™ spherical plastic microspheres, commercially available from Akzo Nobel N.V., HYDROPEL™ QB organic particles and NON-SKID™ modified polypropylene waxes, both commercially available from Shamrock Technologies, Inc. Although the inorganic or organic particles may if desired be obtained in dry powder form, preferably they are employed in aqueous or solvent-based dispersions, as such dispersions are much more easily combined with the polyurethane. In general, solvent-based particle dispersions can easily be combined with waterborne polyurethanes and generally can provide good gloss and good film integrity in the cured coating. However, solvent-based particle dispersions tend to be more expensive than aqueous particle dispersions. When waterborne particle dispersions are combined with waterborne polyurethanes, the resulting coating may have somewhat lower gloss and film integrity. We prefer in such circumstances to combine a waterborne particle dispersion with a suitable dispersing solvent (e.g., alcohols such as methanol, ethanol or isopropyl alcohol) that will dissolve in or be miscible with both water and the polyurethane, and that will help to disperse the particles in the polyurethane. The resulting mixture of waterborne particles and dispersing solvent can be combined with the polyurethane and mixed using a suitable mixing device such as a sonic mixer.

Suitable inorganic and organic particles are available in a wide variety of average particle diameters. Small diameter particles tend to provide better adhesion of the polyurethane to an undercoat layer (if present), but also tend to be more expensive than large diameter particles. Large particles may provide better surface scratch resistance. Preferably, the average particle diameter is about 3 to about 10,000 nanometers, more preferably about 12 to about 7,500 nanometers. In some cases, use of a bimodal mixture of small and large diameter particles can provide a cured finish having an optimal balance of good coating properties, scratch resistance and durability. The polyurethane preferably contains sufficient inorganic or organic (or both inorganic and organic) particles to provide increased scratch resistance compared to a polyurethane that does not contain such particles. If desired, large amounts of inorganic or organic particles can be employed, so long as the other properties of the polyurethane are not unduly harmed by the thickening effect or loss of gloss caused by the particle addition. However, particle additions in relatively small amounts may provide a significant improvement in scratch resistance. Preferably, the polyurethane contains about 1 to about 50 wt. % inorganic or organic particles based on the weight of polymerizable solids in the polyurethane. More preferably, the polyurethane contains about 1 to about 25 wt. % inorganic or organic particles, and most preferably about 1 to about 10 wt. % inorganic or organic particles.

A variety of undercoat compositions can be employed in multilayer polyurethane compositions applied to flooring substrates. Preferred undercoats are film-formers that will adhere to the floor, provide an adherent surface for the polyurethane, and be removable using stripping or peeling. Most preferably the undercoat will be strippable using a chemical stripper that is capable of permeating, dissolving, swelling or otherwise softening the polyurethane sufficiently so that the agent can act upon the undercoat. Thus the choice of undercoat may be determined in part by the chosen polyurethane and stripper. The undercoat desirably should be more strippable than the polyurethane. The undercoat can be solvent-borne, waterborne or 100% solids, and can employ a variety of hardening systems. Water-soluble or water dispersible (as is or with a dispersing agent) acid-containing polymers crosslinked using transition metals (e.g., zinc crosslinked acrylics), alkaline earth metals, alkali metals or mixture thereof are a particularly preferred class of undercoats and a particularly preferred hardening system. These polymers preferably can be stripped using a variety of strippers that dissolve the undercoat or attack its crosslinking site. Other film-forming materials such as zinc-free acrylic finishes (e.g., acrylic copolymers), water-based (e.g., waterborne) latex emulsions, polyvinyl acetate copolymers (e.g., polyvinyl acetate-polyethylene copolymers), polyvinyl alcohol and its copolymers, polyvinylpyrrolidone and its copolymers, modified cellulose, sulfonated polystyrenes and a variety of other materials that will be familiar to those skilled in the art (e.g., film forming water-soluble or water-dispersible polymers other than those already mentioned) can also be employed as undercoats. Preferred undercoat compositions are also described in application Ser. No. 10/756,119 entitled JOB-SITE-RENEWABLE MULTILAYER FLOOR FINISH WITH ENHANCED HARDENING RATE, filed even date herewith, the disclosure of which is incorporated herein by reference. The undercoat can if desired be applied in several layers containing different materials in each layer. The individual layers need not be homogeneous. For example, the ultrafine zinc oxide may if desired "bloom" to the surface of the hardened undercoat.

The undercoat may if desired contain other initiators for the polyurethane hardening system in place of or in addition to the ultrafine zinc oxide. For brevity the ultrafine zinc oxide and other such initiators can be collectively referred to as "topcoat initiators". Preferably the topcoat initiator is not an initiator for the undercoat hardening system. Exemplary topcoat initiators include tin compounds such as dibutyl tin dilaurate, stannous octoate and FASCAT™ 4224 dibutyltin bis(1-thioglycerol) catalyst (commercially available from ATOFINA Chemicals, Inc.); zirconium compounds; amines; and zinc compounds such as zinc crosslinked acrylic dispersions (described further in Application Serial No. 10/755,972 entitled AQUEOUS POLYURETHANE COATING SYSTEM CONTAINING ZINC CROSSLINKED ACRYLIC DISPERSION, filed even date herewith, the disclosure of which is incorporated herein by reference) and zinc carbonates including zinc tetraamine carbonate and zinc ammonium carbonate (described further in application Ser. No. 10/755,976 entitled POLYURETHANE COATING CURE ENHANCEMENT USING ZINC CARBONATE INITIATORS, filed even date herewith, the disclosure of which is incorporated herein by reference).

The undercoat preferably contains water or another suitable diluent, plasticizer or coalescent, including compounds such as benzyloxyethanol; an ether or hydroxyether such as ethylene glycol phenyl ether (commercially available as "DOWANOL EPh" from Dow Chemical Co.) or propylene glycol phenyl ether (commercially available as "DOWANOL PPh" from Dow Chemical Co.); dibasic esters such as dimethyl adipate, dimethyl succinate, dimethyl glutarate, dimethyl malonate, diethyl adipate, diethyl succinate, diethyl glutarate, dibutyl succinate, and dibutyl glutarate (including products available under the trade designations DBE, DBE-3, DBE-4, DBE-5, DBE-6, DBE-9, DBE-IB, and DBE-ME from DuPont Nylon); dialkyl carbonates such as dimethyl carbonate, diethyl carbonate, dipropyl carbonate, diisopropyl carbonate, and dibutyl carbonate; phthalate esters such as dibutyl phthalate, diethylhexyl phthalate, and diethyl phthalate; and mixtures thereof. Cosolvents can also be added if desired to assist in formulating and applying the undercoat. Suitable cosolvents include Butoxyethyl PROPASOL™, Butyl CARBITOL™ acetate, Butyl CARBITOL™, Butyl CELLOSOLVE™ acetate, Butyl CELLOSOLVE™, Butyl DIPROPASOL™, Butyl PROPASOL™, CARBITOL™ PM-600, CARBITOL™ Low Gravity, CELLOSOLVE™ acetate, CELLOSOLVE™, Ester EEP™, FILMER IBT™, Hexyl CARBITOL™, Hexyl CELLOSOLVE™, Methyl CARBITOL™, Methyl CELLOSOLVE™ acetate, Methyl CELLOSOLVE™, Methyl DIPROPASOL™, Methyl PROPASOL™ acetate, Methyl PROPASOL™, Propyl CARBITOL™, Propyl CELLOSOLVE™, Propyl DIPROPASOL™ and Propyl PROPASOL™, all of which are available from Union Carbide Corp.; and mixtures thereof. The concentration may vary depending in part on the other undercoat ingredients and on the intended application and application conditions. As a general guide, when water alone is used as a diluent, the water concentration preferably is from about 15 to about 98 wt. % based on the undercoat solution weight. More preferably, the undercoat contains about 25 to about 95 wt. % water, and most preferably about 60 to about 95 wt. % water. If a diluent, plasticizer, coalescent or cosolvent other than water is included in the undercoat solution, then its concentration preferably is from about 0.1 to about 10 wt. % based on the weight of polymerizable solids in the undercoat, and more preferably about 1 to about 7 wt. %.

The undercoat can contain a variety of adjuvants to alter its performance or properties before or after application to a floor. Useful adjuvants include those mentioned above in connection with the polyurethane.

Often it will be convenient to prepare the undercoat by adding ultrafine zinc oxide to a commercially available one part floor finish material such as PADLOCK™, GEMSTAR LASER™ and TAJ MAHAL™ acrylic floor finishes and COURTMASTER II™ urethane floor finish from Ecolab Inc.; CORNERSTONE™ and TOPLINE™ acrylic floor finishes from 3M; HIGH NOON™ acrylic finish from Butchers; CITATION™ acrylic finish from Buckeye International, Inc., COMPLETE™, SIGNATURE™, TECHNIQUE™ and VECTRA™ acrylic floor finishes from SC Johnson Professional Products; SPLENDOR™, DECADE 90™, PRIME SHINE™ ULTRA and PREMIER™ acrylic finishes and FIRST ROUND and FORTRESS™ urethane acrylic finishes from Minuteman, International, Inc.; FLOORSTAR™ Premium 25 floor finish from ServiceMaster, Inc.; UPPER LIMITS™ acrylic finish from Spartan Chemical Co.; and materials such as those described in U.S. Pat. Nos. 4,517,330 and 5,319,018 and the patents cited therein. Strippable floor coatings designated as "sealers" (e.g., OVER AND UNDER™ floor sealer from S. C. Johnson Professional Products and ACRYL-KOTE™ Seal and Finish and PREP Floor Seal from Minuteman, International, Inc.), strippable coatings based on polyvinylacetates and blends of any of the foregoing may also be employed as undercoats. Polymer emulsions such as DURAPLUS™ 3 zinc crosslinked acrylic dispersion, used as an ingredient in some floor finishes and commercially available from Rohm & Haas Co., and ROSHIELD™ 3120 UV curable acrylate coating from Rohm & Haas (taken alone or blended with styrene maleic anhydride polymer as described in PCT Published Patent Application No. 98/11168) may also be employed as undercoats. If desired, two or more layers of different undercoats can be employed in order to optimize properties such as adhesion to the floor or to the topcoat, wear resistance, strippability, etc.

The polyurethane coatings can be applied to a variety of substrates, including wood, plastics, metals, concrete, wallboard and other mechanical or architectural substrates. The disclosed coatings are particularly well-suited for application to flooring substrates due to their shortened tack-free times. This permits an applicator to walk on the flooring substrate relatively soon after coating application in order to apply additional layers of the composition or to return the floor to service. Representative flooring substrates include resilient substrates such as sheet goods (e.g., vinyl flooring, linoleum or rubber sheeting), vinyl composite tiles, rubber tiles, cork and synthetic sports floors, and non-resilient substrates such as concrete, stone, marble, wood, ceramic tile, grout and Terrazzo. The coating can be jobsite-applied to a flooring substrate after the substrate has been installed (e.g., to monolithic flooring substrates such as sheet vinyl goods, linoleum, cork, rubber sheeting, synthetic sports floors, concrete, stone, marble, grout or Terrazzo, or to multipiece flooring substrates such as vinyl composite tiles, wood floorboards or ceramic tiles), or can be factory-applied to a flooring substrate before it is installed (e.g., to monolithic flooring substrates such as sheet vinyl goods in roll form, or multipiece flooring substrates such as vinyl composite tiles or wood floorboards). Jobsite application is especially preferred, with suitable jobsites including indoor and outdoor sites involving new or existing residential, commercial and government- or agency-owned facilities.

The polyurethane coatings can be applied using a variety of methods, including spraying, brushing, flat or string mopping, roll coating and flood coating. Mop application, especially flat mopping, is preferred for coating most floors. Suitable mops include those described in U.S. Pat. Nos. 5,315,734, 5,390,390, 5,680,667 and 5,887,311. Typically, the floor should first be cleaned and any loose debris removed. One or more undercoat layers or coats (diluted if necessary with water or another suitable diluent or cosolvent) may be applied to the floor. One to three undercoat layers typically will be preferred. When multiple undercoat layers are employed they can be the same or different. Each undercoat layer preferably will have a dry coating thickness of about 2.5 to about 25 μm, more preferably about 2.5 to about 15 μm. Preferably the overall undercoat dry coating thickness will be about 5 to about 100 μm, and more preferably about 5 to about 50 μm.

After the undercoat has hardened sufficiently so that its visual and physical properties have developed and it is safe to apply a polyurethane layer (or if no undercoat is employed, after the cleaned floor has dried), the polyurethane can be applied. The degree of undercoat hardening that will be deemed sufficient for such polyurethane application and the associated waiting period will usually vary depending on factors such as the undercoat and polyurethane formulations, undercoat coating thickness, ambient conditions and polyurethane coating method, and typically may involve a wait of about 15 minutes to about one hour before polyurethane application. Full hardening of the undercoat may not be needed before the polyurethane can safely be applied. In many instances safe application of the polyurethane will be possible once it is possible to walk on the undercoat without marring it.

One or more (e.g., one to three) polyurethane layers may be applied to the floor or to the undercoat layers. The polyurethane layers preferably are applied before the polyurethane pot life elapses. The presence of an initiator for the polyurethane in the undercoat appears primarily to affect the tack-free time for the first polyurethane layer. If the first polyurethane layer is allowed to harden sufficiently so that it can be walked upon, then the tack-free time for subsequent polyurethane layers may not be greatly influenced by the presence of the initiator in the undercoat. However, if such subsequent polyurethane layers are applied before the first polyurethane layer reaches a walk-on state then some reduction in tack-free time may be observed in the subsequent layers, but to a lesser extent than for the first polyurethane layer. The undercoat may be formulated with a view to promoting the efficacy of the initiator in reducing polyurethane tack-free times. The polyurethane usually is formulated with a view to attaining high durability, a factor that may reduce the efficacy of the initiator with respect to such subsequent polyurethane layers. Each polyurethane layer preferably will have a dry coating thickness of about 2.5 to about 200 μm, more preferably about 2.5 to about 100 μm. Preferably the overall polyurethane dry coating thickness will be relatively thin in order to reduce raw material costs, e.g., about 5 to about 150 μm, and more preferably about 5 to about 40 μm. Multilayer finishes preferably will have an overall dry coating thickness of about 10 to about 500 μm, and more preferably about 10 to about 80 μm.

The floor can be placed into service (or returned to service) once the finish has hardened sufficiently to support normal traffic without marring. Inclusion of the ultrafine zinc oxide in the 2K polyurethane topcoat (or if used, in the undercoat) promotes faster topcoat cure and enables the floor to be subjected to normal traffic much earlier than if the initiator is not employed.

The finish can receive normal maintenance until such time as it is desired to remove and renew it. Removal can be carried out, for example, by cleaning the floor (using e.g., a brush or mop) followed by application of a stripper. The chosen stripper may depend in part on the chosen undercoat and polyurethane. Preferred strippers include compositions containing phenyl alcohols (e.g., benzyl alcohol); alkoxy ethers (e.g., glycol ethers such as propylene glycol methyl ether and ETHYL CARBITOL™, BUTYL CARBITOL™ and BUTYL CELLOSOLVE™ solvents from Union Carbide Corp.); alkoxy esters; aryloxy alcohols (e.g., phenoxy ethanol and phenoxy propanol); dibasic esters; N-alkyl pyrrolidones, ketones, esters, metasilicates; amines (e.g., ethanolamine); alkanolamines (e.g., monoethanolamine); acid based agents and caustic agents (e.g., sodium or potassium hydroxide). Strippers containing phenyl alcohols are especially preferred for stripping multilayer finishes employing polyurethane topcoats owing to the relatively high rate at which phenyl alcohols may penetrate such topcoats and their ease of use and low odor. A particularly preferred stripper concentrate contains a polar solvent that is denser than water and a sufficiently low level of cosolvent or surfactant so that upon mixing with water a pseudo-stable aqueous dispersion forms which will phase-separate following application to a surface. Concentrates of this type are described in U.S. Pat. No. 6,544,942. Another preferred stripper concentrate contains about 1 to 75 wt. percent of an ether alcohol solvent having a solubility in water of less than about 5 wt. % of the solvent, and about 1 to 75 wt. % of an ether alcohol solvent/coupler having a solubility in water of about 20 to about 100 wt. % of the solvent/coupler, wherein the vapor pressure of the concentrate is less than 1 millimeter Hg. Concentrates of this type are described in U.S. Pat. No. 6,583,101. The stripper can contain a variety of adjuvants to alter the performance or properties of the stripper before or after application to a cured polyurethane finish. Useful adjuvants include abrasive particles, surfactants, defoamers, indicators, slip reducing agents, colorants and disinfectants. The types and amounts of such adjuvants will be apparent to those skilled in the art.

The stripper should be allowed to stand for a suitable time (e.g., for a minute or more, preferably for two hours or less, and most preferably for between about 5 minutes and about 1 hour) while it softens the finish. After the finish softens sufficiently it can be removed using a variety of techniques including scrubbing, vacuuming, mopping, use of a squeegee, scraping, sweeping, wiping, mild abrasion or other measures that do not remove substantial portions of the floor. Removal will usually be made easier if water or a suitable detergent solution is applied to the softened finish. The floor can be allowed to dry and new layers of the undercoat and polyurethane applied to renew the finish.

Multilayer finishes typically will be sold in the form of a kit including the undercoat and polyurethane in suitable containers or dispensers together with suitable instructions for mixing or dispensing any undercoat and polyurethane components as needed and for applying the undercoat atop a floor and applying the polyurethane atop the undercoat. If desired, the undercoat or polyurethane could be packaged as concentrates intended to be mixed with water or another suitable solvent prior to application. Optionally the kit may include a stripper concentrate in a suitable container. The stripper concentrate typically will be mixed with water or another suitable carrier at, for example, about 5-30% by weight active ingredients prior to application. The kit can also contain additional undercoat materials (e.g., leveling coatings) that can be applied to the floor before application of the undercoat and polyurethane, or various additional materials (e.g., maintenance coats or wax finishes) that can be applied atop the polyurethane. Maintenance coats typically will be applied when the initially-applied multilayer coating exhibits noticeable wear or loss of gloss, and typically will be applied at solids levels that are the same as or somewhat less than the solids levels of the initially-applied polyurethane.

If desired, the multilayer floor finishes can also be factory-applied to a variety of flooring substrates. For example, when factory-applied to a multipiece flooring material, the pieces typically will be coated on at least the top surface and optionally coated or partially coated on the side or bottom surfaces.

The invention is further illustrated in the following non-limiting examples, in which all parts and percentages are by weight (wt.) unless otherwise indicated.

Tile Preparation

Industrial black and white 305 mm×305 mm vinyl composition tiles (commercially available from the Congoleum Corporation) were used in all examples. Before use, the tile surfaces were cleaned and roughened until no longer shiny, by rubbing with MAGICSCRUB™ mild abrasive cleaner (commercially available from Ecolab Inc.) using a non-woven SCOTCH-BRITE™ green abrasive scrub pad (commercially available from 3M Company). The cleaned tiles were rinsed with tap water and dried at room temperature. This removed all factory applied coatings and surface soil, and provided a consistently reproducible surface.

Undercoat Formulations and Coating Method

PADLOCK™ metal crosslinked acrylic polymer-based floor finish (commercially available from Ecolab Inc. and identified below as Undercoat No. 1) and PREMIUM 25™ acrylic polymer-based floor finish (commercially available from Aramark Corporation and identified below as Undercoat No. 2) were both employed as undercoats. The tiles were coated by applying a weighted undercoat amount in two layers to the cleaned tile surface using commercially available microfiber pads, at a wet coating rate of about 48 m$^2$/liter. The first and subsequent undercoat layers were allowed to air dry for at least 15 minutes before applying any further undercoat layers.

Topcoat Formulations and Coating Method

Two-component polyurethane topcoat formulations based on a commercially available polyester polyol resin (BAYHYDROL™ XP-7093, 30% nonvolatiles, Bayer Corporation), and commercially available hexamethylene diisocyanates (DESMODUR™ N-3600 or BAYHYDUR™ XP-7165, both from Bayer Corporation) were prepared as follows. The polyester polyol precursor (designated as Part A in Table 1) was made by mixing the polyol, surfactants and water as set out below. Part A was combined with the isocyanate precursor (designated Part as B in Table 1) according to the weight ratios given in Table 1. The topcoat precursors were mixed vigorously for three minutes, then allowed to sit for 10 to 12 minutes before applying a pre-weighed amount of the topcoat atop the air-dried undercoat using a flocked pad, at a wet coating rate of about 16-18.4 m$^2$/liter. The topcoated tiles were allowed to dry at room temperature. The dried tiles had a tack-free, glossy finish made from a polyacrylate-based undercoat and a polyurethane-based topcoat.

TABLE 1

Topcoats

| | Ingredient | Top coat No. 1 Parts by weight | Top coat No. 2 Parts by weight |
|---|---|---|---|
| Part A | Polyester polyol[1] | 88.90 | 54.95 |
| | Silicone defoamer[2] | 0.13 | 0.08 |
| | Surface agent[3] | 0.06 | 0.04 |
| | Surface agent[4] | 1.16 | 0.77 |
| | Deionized water | 9.75 | 10.09 |
| Part B | Hexamethylene diisocyanate[5] | 39.78 | |
| | Hydrophilic hexamethylene diisocyanate[6] | 100 | 23.38 |
| Mix Ratios | Part A | 22.5 | 22.15 |
| | Part B | 7.5 | 7.85 |

[1]BAYHYDROL™ XP-7093, 30% nonvolatiles, Bayer Corporation.
[2]BYK™ 025, BYK Chemie.
[3]BYK™ 348, BYK Chemie.
[4]BYK™ 380, BYK Chemie.
[5]DESMODUR™ N-3600, Bayer Corporation.
[6]BAYHYDUR™ XP-7165, Bayer Corporation.

Film Evaluation

The coated tiles were evaluated to assess tack-free time, solution pot life, gloss and removability, as follows:

Tack-Free Evaluation

Polyurethane tack-free time was evaluated by placing a small (7.6 mm×7.6 mm) cotton square on the coating surface and covering the cotton square with a 2 kg weight for 30 seconds. The weight was removed and the cotton lightly brushed or rubbed away using a finger. Any substantially noticeable amount of fibers remaining on the topcoat indicated the topcoat was still tacky and that the tack-free time had not been reached. The tack-free time was defined as the interval after which no fibers were retained on the tested coating surface. Coating surfaces that exhibited a shorter tack-free time tended to cure or harden more quickly overall than coatings with longer tack-free times.

Polyurethane Pot Life Evaluation

Polyurethane pot lives were determined by observing the elapsed time between the start of mixing and the first visual appearance of a precipitate or gel in the polyurethane. The longer it took for precipitation to occur or for a gel to appear, the better the pot life.

Gloss

Film gloss was measured at 60° and 20° using a Micro-TRI-Gloss meter (commercially available from Paul N. Gardner Co., Inc.). An average of 10 readings was reported. The standard deviation for individual samples was less than 3%.

Strippability

Chemical-physical removability (strippability) was evaluated by affixing an adhesive-backed foam ring to the polyurethane surface. The inner portion of each ring was filled with a 13 wt. % aqueous solution of the stripper shown below in Table 2. The resulting aqueous stripper solution was allowed to contact the coating surface for 10 to 20 minutes and then poured out of the ring. The coating surface was rinsed with tap water. The treated area was viewed in relation to the untreated area by peeling the foam ring away from the coating and briefly wiping with a paper towel to remove loose finish. A visually determined percent coating removal was recorded, with higher removal values indicating more removable coatings and a 100% value indicating complete removal.

TABLE 2

| Stripper | |
| --- | --- |
| Ingredient | Parts |
| Benzyl Alcohol[1] | 57.03 |
| Monoethanolamine, 99%[2] | 22.81 |
| Diethylene glycol monobutyl ether[3] | 5.703 |
| Dipropylene glycol n-butyl ether[4] | 5.703 |
| Propylene glycol phenyl ether[5] | 5.703 |
| Surface active agent[6] | 1.901 |
| Wetting agent[7] | 0.115 |
| Deionized water | 1.035 |
| TOTAL | 100 |

[1]Benzyl alcohol, technical grade, Velsicol Chemical.
[2]Monoethanolamine, 99%, Dow Chemical.
[3]Diethylene glycol monobutyl ether, 99%, Equistar.
[4]Dipropylene glycol n-butyl ether, 98.5%, Dow Chemical.
[5]Propylene glycol phenyl ether, Dow Chemical.
[6]Linear Alcohol (C12-15) ethoxylate 9 EO, Rhodia.
[7]ZONYL ™ FSJ, 40% active, Dupont.

Example 1

Ultrafine zinc oxide, regular powdered zinc oxide and dibutyltin dilaurate were compared as topcoat initiators by adding roughly similar solids weight amounts of these substances to the topcoat or undercoat of a multilayer floor finish system. The undercoat was prepared using two layers of Undercoat No. 2 applied to vinyl composition tiles cleaned as described above. In Run Nos. 1-1, 1-2, 1-4 and 1-6 no initiator was added to the undercoat. In Run No. 1-3 ultrafine zinc oxide was added to the undercoat prior to application. In Run Nos. 1-5 and 1-7 the ultrafine zinc oxide was replaced with powdered zinc oxide or with dibutyltin dilaurate, together with an amount of water like that present in the ultrafine zinc oxide used in Run no. 1-3. The topcoat was prepared using Topcoat No. 2, and applied after allowing the undercoated tiles to air dry for two hours. In Run Nos. 1-1, 1-3, 1-5 and 1-7 no initiator was added to the topcoat. In Run No. 1-2 ultrafine zinc oxide was added to Part A of the topcoat prior to mixing with Part B and application to the undercoat. In Run Nos. 1-4 and 1-6 the ultrafine zinc oxide was replaced with powdered zinc oxide or with dibutyltin dilaurate, together with an amount of water like that present in the ultrafine zinc oxide used in Run no. 1-2. The polyurethane pot life times, tack-free times and gloss levels were determined as described above. The results are shown below in Table 3.

TABLE 3

| | | | | Results | | | |
| --- | --- | --- | --- | --- | --- | --- | --- |
| Run No. | Initiator | Wt. % Initiator in Undercoat | Wt. % Initiator in Topcoat | Topcoat Pot Life (hours:min) | Topcoat Tack-free Time (hours:min) | 60° Gloss | 20° Gloss |
| 1-1 | None | 0 | 0 | >3:00 | 9:00 | 90 | 81 |
| 1-2 | UF ZnO[1] | 0 | 0.08 | 1:12 | 3:30 to 4:00 | 89 | 77 |
| 1-3 | UF ZnO | 10 | 0 | >3:00 | 3:00 | 90 | 78 |
| 1-4 | ZnO[2] | 0 | 0.08 | >3:00 | 9:00 | 89 | 82 |
| 1-5 | ZnO[2] | 10 | 0 | >3:00 | 9:00 | 89 | 79 |
| 1-6 | MT-12[3] | 0 | 0.08 | 2:52 | 4:30 | 88 | 70 |
| 1-7 | MT-12 | 10 | 0 | >3:00 | 9:00 | 88 | 64 |

[1]NANOTEK ™ ZnO aqueous zinc oxide dispersion, 52% nonvolatiles, commercially available from Nanophase Technologies Corporation.
[2]Zinc Oxide powder, particle size <1 μm, 99.9%, product no. 205532 from Aldrich Chemical Co.
[3]METACURE ™ T-12 dibutyl tin dilaurate, commercially available from Air Products and Chemicals Inc.

The results in Table 3 demonstrate that the non-organometallic initiator ultrafine zinc oxide could substantially reduce polyurethane tack-free times when added to the topcoat or to the undercoat (compare Run Nos. 1-1, 1-2 and 1-3). Regular powdered zinc oxide did not have such an effect in either the topcoat or undercoat (compare Run Nos. 1-1, 1-4 and 1-5). Dibutyltin dilaurate also reduced the tack-free time when added to the topcoat but did not do so when added to the undercoat (compare Run Nos. 1-1, 1-6 and 1-7). This was significant since it indicated that ultrafine zinc oxide could successfully be employed in the undercoat to reduce the topcoat tack-free time (and without reducing the topcoat pot life), whereas dibutyltin dilaurate could not be so used.

Better 20° gloss retention was also obtained using ultrafine zinc oxide than using dibutyltin dilaurate. This is significant since the 20° gloss value provides a measure of the distinction of image (DOI) of the surface and its surface reflectivity or loss thereof. Maintenance of a high DOI is important for floor finish applications.

Pot life was shortened when using either ultrafine zinc oxide or dibutyltin dilaurate in the topcoat but remained over one hour, a time sufficient for typical floor applications.

Example 2

Using the method of Example 1, varying amounts of ultrafine zinc oxide were added to Undercoat No. 2. Two layers of the thus-modified undercoat formulations were applied to cleaned tiles. After application of the second undercoat layer, the tiles were allowed to dry for 45 to 60 minutes prior to application of a layer of Topcoat No. 2. The topcoat tack-free times were determined as described above. The results are shown below in Table 4.

TABLE 4

| Run No. | Initiator | Initiator Amount (%) | Tack-free Time (hours:min) |
| --- | --- | --- | --- |
| 2-1 | None | 0 | >6:00 |
| 2-2 | UF ZnO | 3 | 5:30 |
| 2-3 | UF ZnO | 6 | 5:00 |
| 2-4 | UF ZnO | 9 | 3:00 |
| 2-5 | UF ZnO | 12 | 2:00 |
| 2-6 | UF ZnO | 15 | 2:00 |

The results in Table 4 show that increasing the level of ultrafine zinc oxide can significantly reduce (in these runs, by more than 66%) tack-free times for the polyurethane topcoat.

Example 3

Using the general method of Example 1 but using Undercoat No. 1, Topcoat No. 1 and a 90 to 120 minute air drying period between application of the second undercoat layer and application of the topcoat, ultrafine zinc oxide was added in varying amounts to the undercoat or to both the undercoat and topcoat. The polyurethane pot life times, tack-free times and gloss levels were determined as described above. The results are shown below in Table 5.

TABLE 5

| | | | | Results | |
|---|---|---|---|---|---|
| Run No. | Initiator | Wt. % Initiator in Undercoat | Wt. % Initiator in Topcoat | Topcoat Pot Life (hours:min) | Topcoat Tack-free Time (hours:min) |
| 3-1 | None | 0 | 0 | >2:35 | 6:00 |
| 3-2 | UF ZnO | 0 | 0.12 | 1:15 | 3:18 |
| 3-3 | UF ZnO | 9 | 0.12 | 1:15 | 2:22 |
| 3-4 | UF ZnO | 0 | 0.15 | 1:12 | 2:52 |
| 3-5 | UF ZnO | 9 | 0.15 | 1:12 | 1:57 |

The results in Table 5 show that the topcoat tack-free times can be significantly reduced when ultrafine zinc oxide is added directly to the topcoat. The tack-free times can be further reduced when ultrafine zinc oxide is added to both the topcoat and undercoat. In each case the topcoat pot life was also reduced but remained above 1 hour. If a longer pot life is required then the initiator level in the topcoat could be reduced or the initiator could be added only to the undercoat.

Example 4

Using the general method of Example 3 but using a 90 minute air drying period between application of the second undercoat layer and application of the topcoat, ultrafine zinc oxide was added to only the second undercoat layer or to both undercoat layers and compared to a multilayer floor finish system containing no ultrafine zinc oxide in the undercoat. The topcoat tack-free times were determined as described above. The results are set out below in Table 6.

TABLE 6

| Run No. | Initiator | Initiator Location in Undercoat Layers | Initiator in the Undercoat Layer(s) (%) | Topcoat Tack-free Time (hours:min) |
|---|---|---|---|---|
| 4-1 | None | None | 0 | 6:06 |
| 4-2 | UF ZnO | Uppermost undercoat layer only | 9 | 2:41 |
| 4-3 | UF ZnO | Both layers | 9 | 2:41 |

The results in Table 6 demonstrate that the initiator need only be added to the uppermost undercoat layer in order to reduce the topcoat tack-free time. In these runs addition of ultrafine zinc oxide curing agent to both undercoat layers did not yield a further significant reduction in topcoat tack-free time. This suggests that reduced raw material cost might be achieved by employing two undercoat formulations, with ultrafine zinc oxide being added only to the second undercoat formulation.

Example 5

Two layers of undercoat No. 1 were applied to bare tiles and allowed to dry overnight. Ultrafine zinc oxide dispersed in an organic solvent was added to part B of Topcoat No. 1 at three different addition levels, mixed with Part A and applied to the coated tiles. The chemical removability of a control composition containing no ultrafine zinc oxide and the composition of Run No. 5-4 (containing 0.4% ultrafine zinc oxide in the topcoat) were evaluated using the above-described Strippability test. The results are shown below in Table 7:

TABLE 7

| | | | Results | | |
|---|---|---|---|---|---|
| Run No. | Initiator | Wt. % Initiator in Topcoat | Topcoat Pot Life (hours:min) | Topcoat Tack-free Time (hours:min) | % Removal |
| 5-1 | None | 0 | >2:30 | 7:00 | 95-100% |
| 5-2 | UF ZnO 2[1] | 0.08 | 2:02 | 5:00 | ND[2] |
| 5-3 | UF ZnO 2[1] | 0.12 | 1:43 | 4:00 | ND[2] |
| 5-4 | UF ZnO 2[1] | 0.15 | 1:20 | 4:00 | 95-100% |

[1]NANOTEK ZnO zinc oxide dispersed in di(ethylene glycol) diethyl ether, 40.41% solids, commercially available from Nanophase Technologies Corp.
[2]Not Determined.

The results in Table 7 demonstrate that addition of ultrafine zinc oxide to the topcoat provided a substantial reduction in polyurethane tack-free times without adversely affecting strippability.

Various modifications and alterations of this invention will be apparent to those skilled in the art without departing from the scope and spirit of this invention. It should be understood that this invention is not limited to the illustrative embodiments set forth above.

We claim:
1. An autohardenable polyurethane floor coating comprising about 0.001 to about 0.01 wt. % ultrafine zinc oxide having an average particle diameter or average crystallite size of about 10 to about 200 nm to decrease the coating tack-free time and to provide a pot life time of at least 1 hour suitable for use as a job-site applied floor coating having a thickness of greater than 5 μm.
2. A coating according to claim 1 wherein the ultrafine zinc oxide has a surface area greater than about 1 m$^2$/g as determined using the BET method.
3. A coating according to claim 1 wherein the ultrafine zinc oxide has a surface area of about 10 to about 200 m$^2$/g as determined using the BET method.
4. A coating according to claim 1 containing sufficient ultrafine zinc oxide to decrease the coating tack-free time by at least about 10%.
5. A coating according to claim 1 containing sufficient ultrafine zinc oxide to decrease the coating tack-free time by at least about 30%.
6. A coating according to claim 1 containing sufficient ultrafine zinc oxide to decrease the coating tack-free time by at least about 50%.
7. A coating according to claim 1 wherein the polyurethane comprises a waterborne multicomponent polyurethane.
8. A coating according to claim 1 wherein sufficient zinc oxide is added so that the pot life time is at least 2 hours.

9. A coating according to claim 1 wherein the 20 degree gloss value for the hardened coating is greater than 60.

10. A jobsite-renewable floor finish kit comprising a substantially isocyanate-free undercoat, an autohardenable polyurethane topcoat and instructions for jobsite application of the undercoat to a floor and the topcoat to the undercoat, wherein the topcoat contains about 0.001 to about 0.01 wt. % ultrafine zinc oxide having an average particle diameter or average crystallite size of about 10 to about 200 nm to decrease the topcoat tack-free time and to provide a pot life time of at least 1 hour.

11. A kit according to claim 10 wherein the ultrafine zinc oxide has a surface area greater than about 1 m$^2$/g as determined using the BET method.

12. A kit according to claim 10 wherein the ultrafine zinc oxide has a surface area of about 10 to about 200 m$^2$/g as determined using the BET method.

13. A kit according to claim 10 containing sufficient ultrafine zinc oxide to decrease the polyurethane tack-free time by at least about 10%.

14. A kit according to claim 10 containing sufficient ultrafine zinc oxide to decrease the polyurethane tack-free time by at least about 30%.

15. A kit according to claim 10 containing sufficient ultrafine zinc oxide to decrease the polyurethane tack-free time by at least about 50%.

16. A kit according to claim 10 wherein the undercoat contains about 1 to about 50 wt. % ultrafine zinc oxide.

17. A kit according to claim 10 wherein the undercoat contains about 2 to about 30 wt. % ultrafine zinc oxide.

18. A kit according to claim 10 wherein the topcoat and undercoat contain ultrafine zinc oxide.

19. A kit according to claim 10 wherein the polyurethane comprises a waterborne multicomponent polyurethane.

20. A kit according to claim 19 wherein the polyurethane components comprise (a) a polyisocyanate and (b) a polyester polyol, polyether polyol, acrylic polyol, polyurethane polyol or combination thereof.

21. A kit according to claim 19 further comprising a waterborne maintenance coat composition.

22. A kit according to claim 10 further comprising a stripper.

23. A kit according to claim 10 wherein the hardened polyurethane and undercoat can be removed from the floor by applying a stripper composition containing at least one polar solvent, allowing the stripper composition to contact the polyurethane for sufficient time to soften the polyurethane and undercoat, and removing the softened polyurethane and undercoat without removing substantial portions of the floor.

* * * * *